May 9, 1939. O. W. BECKER 2,157,319
METHOD OF HARDENING STRUCTURES PRODUCED FROM FIBROUS
MASSES DERIVED FROM ANIMAL HIDE SUBSTANCES
Original Filed Oct. 23, 1933 2 Sheets-Sheet 1
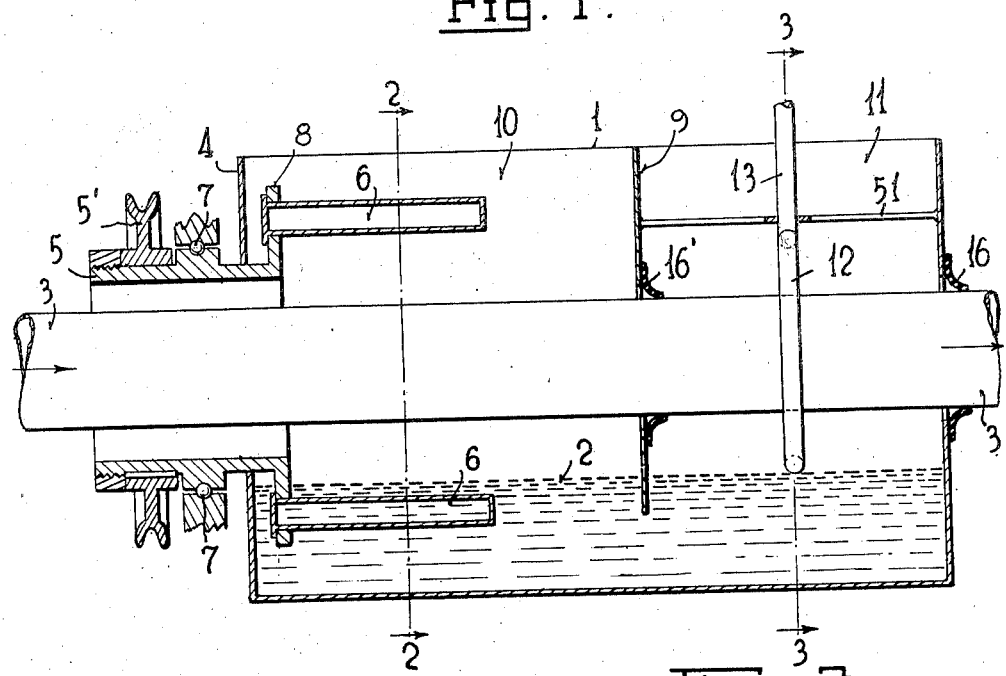
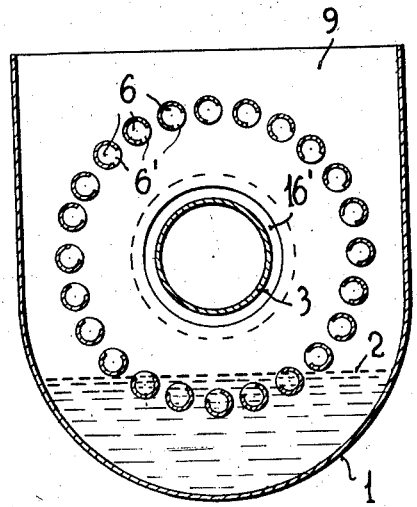
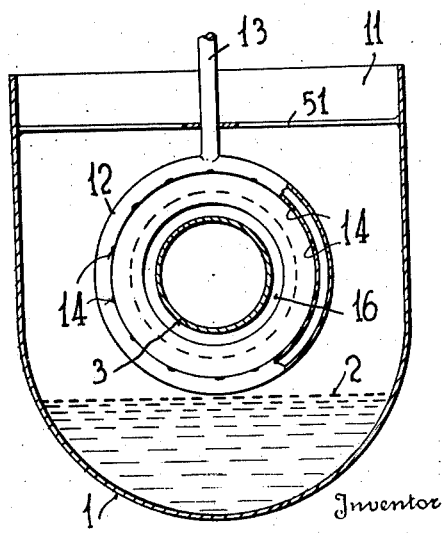
Inventor
Oskar Walter Becker,
By
Attorneys May 9, 1939.     O. W. BECKER     2,157,319
METHOD OF HARDENING STRUCTURES PRODUCED FROM FIBROUS
MASSES DERIVED FROM ANIMAL HIDE SUBSTANCES
Original Filed Oct. 23, 1933     2 Sheets-Sheet 2

FIG. 4.

Inventor
Oskar Walter Becker.
By Bailey & Larson
Attorneys

Patented May 9, 1939

2,157,319

UNITED STATES PATENT OFFICE 2,157,319

METHOD OF HARDENING STRUCTURES PRODUCED FROM FIBROUS MASSES DERIVED FROM ANIMAL HIDE SUBSTANCES

Oskar Walter Becker, Heidelberg, Germany, assignor to firm of Naturin Gesellschaft mit beschränkter Haftung, Weinheim, Germany Original application October 23, 1933, Serial No. 694,904. Divided and this application April 22, 1936, Serial No. 75,901. In Germany July 21, 1933

10 Claims. (Cl. 99—176)

This invention relates to a method of hardening structures produced from fibrous masses derived from animal hide substances. The structures may be in the form of sheets, bands, threads or tubes although other forms may, of course, also be treated. In describing and illustrating the invention reference will be made to such structures as are in the form of endless tubes which are later divided to constitute artificial sausage skins.

In its broader aspects the invention consists in treating structures of the type mentioned with the crude or purified distillate of a cellulose-containing substance, the distillate being applied in liquid, gaseous or vaporous condition. It has been found that crude or purified distillate produced during the carbonization or distillation of cellulose-containing substances such as wood, peat, straw, cocoa shells, cocoanut shells, rice husks, or other vegetable waste, is particularly good for use with this method.

Not only does treatment with such distillate harden such structures perfectly, but the structures are rendered impervious or nearly impervious to water, and consequently will be rendered more or less incapable of swelling. They will thus retain their strength when dipped, moistened, or kept in damp air. These benefits will be particularly advantageous in artificial sausage skins. The treatment in accordance with the invention also results in lasting sterilization and the consequent prevention of putrefaction, mold and the like in the treated structures.

With structures produced in endless form, such as with artificial sausage skins, the method preferably is repeated several times in succession, the structure being dried between applications of the hardening distillate. With endless structures, such as artificial sausage skins, it is particularly advisable to treat such structures with a liquid hardening agent as they pass through drying spaces, ducts, or the like, and then to permit them to dry again before repeating.

So that the invention will be more easily understood, the method will be described as it actually may be practiced on artificial sausage skins of endless structure. Such skins are passed through compartments. The distillate may be disposed in the bottom of the first compartment and may be applied to the sausage skin by means of scooping appliances which encircle the skin in the first compartment and which rotate so as to dip in the distillate and deposit the same on the skin. The sausage skin then passes to a second compartment in which the distillate liquid hardening agent is distributed as uniformly as possible over the surface of the skin.

Reference is now made to the accompanying drawings in which:

Fig. 1 is a longitudinal section of a device for carrying out the method.

Fig. 2 is a cross section on the line 2—2 of Fig. 1.

Fig. 3 is a cross section on the line 3—3 of Fig. 1.

Fig. 4 is a diagram of a plant for producing the hardening agent.

The method may, for example, be carried out with the aid of a vessel or container 1 which may be trough-shaped at the bottom. The lower trough-shaped portion is filled with a distillate of the type mentioned above up to about the level 2. The endless structure to be treated, in this case an artificial sausage skin 3, is moved through the vessel or container 1 in a longitudinal direction. The vessel or container may be arranged in a drying channel in which the artificial sausage skin is dried immediately after its production. The drying preferably is effected by hot air according to my copending patent application Serial No. 554,919, filed August 3, 1931.

The front wall 4 of the vessel or container 1 is provided with a circular opening in which is mounted the cylindrical carrier 5. The carrier is provided with a driving pulley 5' so as to be rotated about its longitudinal axis on the bearings 7 disposed in supports 7'. The inner end of the cylindrical carrier 5 is provided with a flange or ring 8 to which is secured the scooping elements 6.

As will be apparent from Figs. 1 and 2, these scooping elements 6 encircle a portion of the sausage skin 3 as it passes through the vessel or container 1. As the carrier 5 is rotated, each of the scooping elements 6 successively will dip in the distillate, pick up some and carry it upwardly and then spill or deposit it on the sausage skin 3 so as to moisten the same completely. In order to permit such action each element 6 may, as shown, be constructed as a piece of pipe closed at each end but provided with a longitudinal slot or opening 6'.

The vessel or container 1 may be divided by a wall 9 into two compartments, the compartment 10 in which the scooping elements 6 are disposed, and the compartment 11 in which means for distributing the distillate on the skin is disposed. Such means may be in the form of a hollow ring 12 which surrounds the sausage skin 3 and which is provided with small openings 14 facing the sausage skin. The ring 12 is supplied with compressed air through the pipe 13. The ring 12 may be supported by any suitable means such as by a spider 51.

The dividing wall 9 and the rear wall 15 are each provided with openings to permit the passage of the artificial sausage skin 3 and rubber packings 16 and 16' are provided, the cross section of which is somewhat smaller than that of the sausage skin so that they will closely hug the latter. A similar packing may, of course, be provided for the front wall 4.

It should be manifest that after the distillate has been applied by the scooping elements 6 in compartment 10, the artificial sausage skin 3 passes into compartment 11. In doing so the rubber packing 16' will distribute the distillate liquid hardening agent on the skin more or less uniformly. As the skin passes through the ring 12 compressed air coming therefrom through the openings 14 strikes the skin and further increases the uniformity of distribution. The action of the rubber packing 16 as the skin leaves the compartment 11 even further increases the uniformity of the distribution of the distillate on the surface of the skin.

After the endless structure leaves the vessel or container 1 it is again subjected to drying preferably by means of hot air.

In the case of endless structures, it is advisable to repeat the treatment just described several times. This can, of course, be accomplished in various types of apparatus. One such structure suitable for carrying out the method repeatedly is disclosed in my copending application Serial No. 694,904, filed October 23, 1933. The present case is a divisional application of that case. In that application several of the vessels or containers such as disclosed here are illustrated and described as disposed in series within an outer drying casing so that the sausage skin will pass successively through a vessel or container, then through a drying space, and then through another container, and so on.

The distillate hardening agent may be applied in other ways than as described above. This invention contemplates applying the distillate to the structures, whether they be endless or otherwise, by washing, immersion, spraying or squirting. This may be accomplished by any suitable apparatus such as by spraying pistols, splash rings, and the like. The type of application and apparatus therefor will in a measure depend upon the form or nature of the structure to be hardened.

The treatment described involving wetting or moistening of the structure with a liquid distillate may be followed by hardening operations employing a gaseous or vaporous distillate of the general type mentioned. To carry out such a step the structures may be suspended or supported in a gas tight chamber into which the gasified or vaporized distillate is then introduced. Furthermore, treatment with a gaseous or vaporous distillate may suffice in some cases to bring about the desired hardening so that the use of a liquid distillate can be dispensed with.

The distillate may be produced in various ways. As an example, it may be produced by the carbonization of pine wood or beech wood. Preferably it is purified. It should be freed from coloring constituents prior to being used for hardening particularly if the structure to be hardened is to be colorless in its final form.

Instead of a crude or purified distillate of cellulose-containing substances containing wood or the like, fractions of such distillates such as acetaldehyde or higher aldehydes, may be used for hardening.

So that the manner in which the distillate may be made will be clear, I have diagrammatically shown in Fig. 4 a plant for producing the same.

A sawdust layer 20 of suitable thickness is spread over a grate 21 of a smouldering or combustion device 22 constructed like a smoking furnace, and combustion or smouldering takes place while air is amply supplied from above. The ashes drop into a box 23, and the smoke gases are drawn off by a funnel 24, pass into a spark catcher 25 and thence through a pipe 26 into a condensing device 27. The non-condensed portion of the smoke is drawn off by a blower 28 and discharged through a chimney 29.

The condensing device 27 comprises two double pipes. The smoke flows in the inner pipes 30, 31, and in the outer pipes 32, 33, counter-current to the smoke, a cooling medium, for example, water, circulates. The directions of flow are indicated by arrows, the cooling water entering at 34 and coming out at 35. The smoke-carrying pipes 30, 31 extend into a container 36 for the condensate. The overflow 37 leads excess condensate into a catch 38. The condensate flows through a pipe 39 having preferably a U-bend 39a into a distilling vessel 40 of usual type. The evaporated condensate then passes through a conduit 41 fitted with a stopcock 42 into the coil 43 of a cooling device 44 into which cooling water enters at 45 and is discharged at 46. The distillate is collected in a vessel 47 and can be used as a liquid for hardening.

If the evaporated condensate is to be used for hardening in vaporous or gaseous form, it is guided through a branch piping 48 fitted with a stopcock 49 to a gas chamber, not shown, the piping 48 being preferably provided with heat insulating means 50 comprising, for instance, a heat jacket.

Structures, such as artificial sausage skins and the like, when hardened with distillates in the manners described above always constitute a solid product which is more or less impervious to water, or water repellant. Consequently they are incapable of swelling and they retain their strength even when moist. Being permanently sterilized such structures are, furthermore, resistant to putrefaction, mold, and the like and are therefore, as will be obvious, particularly suited for uses requiring such qualities. This is especially the case with artificial sausage skins produced from fibrous hide masses.

Minor changes and departures from the method described may, of course, be made without departing from the spirit of the invention and I do not wish to be limited except in accordance with the accompanying claims.

Having now described my invention, what I claim as new and desire to secure by Letters Patent of the United States is:

1. A method of hardening structures produced from fibrous masses derived from animal hide substances, which consists in subjecting the completed structures to the action of a distillate obtained from cellulose-containing substances for the purpose of hardening such structures.

2. A method of treating structures produced from fibrous masses derived from animal hide substances, which consists in first forming the structures into their final shape and then subjecting them to the action of a distillate obtained from cellulose containing substances for the purpose of hardening such structures.

3. A method of treating structures produced from fibrous masses derived from animal hide substances, which consists in first forming the structures into their final form, purifying a distillate obtained from cellulose-containing substances by the redistillation of the original distillate obtained from said substances, and subjecting said structures to the action of said distillate while maintaining said structures in their final form.

4. A method according to claim 2, said distillate being in liquid condition.

5. A method according to claim 2, said distillate being in gasified condition.

6. A method of treating structures produced from fibrous masses derived from animal hide substances, which consists in first forming the structures into their final form, then causing said structures to move progressively through zones in which they are alternately subjected to the action of a distillate obtained from cellulose-containing substances to harden them, dried, and then subjected to the action of said distillate.

7. A method of hardening structures produced from fibrous masses derived from animal hide substances, which consists in first subjecting the structures to the action of a liquid distillate and then to the action of a gasified distillate, both of said distillates being obtained from cellulose-containing substances.

8. A method of treating structures produced from fibrous masses derived from animal hide substances, which consists in pouring on said structures a liquid distillate obtained from cellulose-containing substances to harden the same, distributing said distillate uniformly on the surface of said structures, and directing compressed air against the surface of said structures to insure further uniform distribution of said distillate and to harden said structures further.

9. A method of hardening structures produced from fibrous masses derived from animal hide substances, which consists in subjecting the completed structures to a purified liquid distillate obtained from cellulose-containing substances which is substantially free from coloring constituents and which has been obtained by the redistillation of the original distillate obtained from said substances for the purpose of hardening such structures.

10. A method of hardening structures produced from fibrous masses derived from animal hide substances, which consists in subjecting the completed structures to a purified gasified distillate obtained from cellulose-containing substances which is substantially free from coloring constituents for the purpose of hardening such structures.

OSKAR WALTER BECKER.